(No Model.)
G. A. PADDOCK.
HARVESTER REEL.
No. 303,182. Patented Aug. 5, 1884.
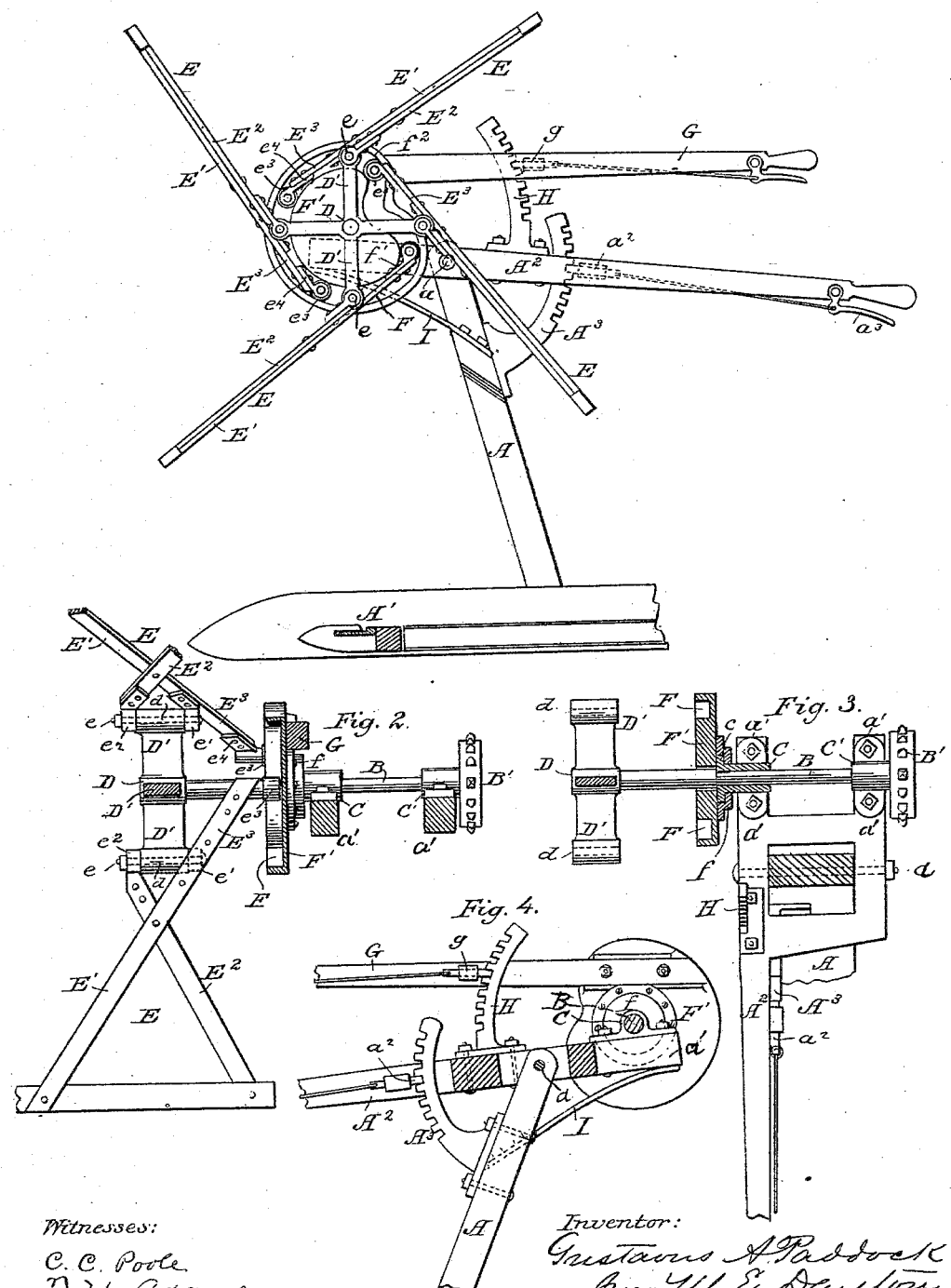

UNITED STATES PATENT OFFICE.

GUSTAVUS A. PADDOCK, OF BEAVER DAM, WISCONSIN.

HARVESTER-REEL.

SPECIFICATION forming part of Letters Patent No. 303,182, dated August 5, 1884.

Application filed December 18, 1882. (No model.)

*To all whom it may concern:*

Be it known that I, GUSTAVUS A. PADDOCK, of Beaver Dam, in the county of Dodge and State of Wisconsin, have invented certain new and useful Improvements in Reels for Harvesting-Machines; and I do hereby declare that the following is a full, clear, and exact description thereof, reference being had to the accompanying drawings, and to the letters of reference marked thereon, which form a part of this specification.

This invention relates to reels for harvesting-machines, and more particularly to devices for giving a variable motion to the arms or beaters of such reels, whereby such beaters receive an accelerated motion at the time they are passing through the grain and a retarded motion at or about the time of leaving it, the object of such variable motion being to cause the beaters to throw the grain quickly back over the cutters and to leave the grain slowly, so that it shall not be thrown by such beaters behind the machine or upon the back edge of the apron in self-binding harvesters.
The object of the invention is to provide an improved construction in the devices above referred to; and it consists in the matter hereinafter described, and pointed out in the claims.
In the drawings, Figure 1 is a side view of a reel constructed as proposed by my invention. Fig. 2 is a rear elevation of a portion of the same, showing two of the beaters and a portion of the cam-plate broken away. Fig. 3 is a plan view of the reel-hub and shaft-bearing, showing the bearing of the same and the cam-plate in section. Fig. 4 is a detail side elevation showing the lever for adjusting the cam-plate and means for raising and lowering the reel.

A is a standard for supporting the reel and its connecting parts, which is attached in a suitable position upon the frame of a reaper or harvester.
In the drawings, Fig. 1, the reel and its supporting-standard A are shown in connection with the cutter-bar A' and apron of a self-binding harvester.

To the top of the standard A is pivoted by means of a bolt, $a$, a forked lever, A$^2$, upon which the reel-shaft B is mounted by means of boxes C C', bolted to the forked ends $a'$ $a'$ of the said lever.

Upon the standard A is placed a notched segment, A$^3$, which extends upwardly at the side of the rearwardly-extending arm of the lever A$^2$. A spring catch or detent, $a^2$, upon said lever is adapted to engage the notches upon the segment A$^3$, so that the lever A$^2$ may be swung upon its pivot $a$ and held in any desired position, by which means the reel-shaft B upon the forked ends $a'$ $a'$ of said lever may be adjusted vertically and in reference to the cutter-bar of the machine. The detent $a^2$ is operated by a rod connected to a bent lever, $a^3$, arranged at the handle of the lever A$^2$, in a well-known manner.

The reel-shaft B is extended outside of its bearing C, and has upon the extremity of its projecting portion a head, D, having cast upon it four radial arms, D', to which the beater-arms E of the reel are pivoted. A sprocket-wheel, B', is shown upon the end of such shaft opposite to the reel and outside of the bearing C', which may be actuated by a chain belt operated from the operative parts of the machine; but the said reel-shaft may be operated in any desired manner.

The beater-arms E are each composed of two pieces or slats, E' and E$^2$, which are arranged obliquely to the reel-shaft and crossed near their inner ends, and are pivoted to the arms D' by means of pivot-pins $e$, which pass through apertures $d$ in the ends of the arms D', and through lugs $e'$ and $e^2$ on the slats E' and E$^2$. The slats E' are extended beyond their pivotal points $e'$, so as to form short arms E$^3$, upon the ends of which are placed pins or friction-rollers $e^3$. The said friction-rollers $e^3$ are placed upon bearing-pins attached to plates $e^4$, bolted to the ends of the said slats, the axes of said pins being parallel to the reel-shaft B, and are adapted to move in a cam-groove, F, in a cam-plate, F', attached to the bearing-box C upon the arm A$^2$. As shown in the drawings, the cam-groove F is made substantially concentric with the shaft of the reel for about one-half its circumference and is curved between the points $f'$ and $f^2$ toward the center of the cam-plate. When, during the rotation of the reel-shaft, the rollers $e^3$ upon the beater-arms are traversing the concentric portion of the cam-groove, the beater-arms remain unchanged in position with reference to the reel-shaft, but upon reaching the irregularly-curved portion at $f'$ the inner ends of the beater-arms are carried inwardly toward the axis of the shaft, and their outer ends are swung rapidly toward the rear, thus giving an accelerated motion to the ends of the said beater-arms. The continued revolution of the reel-shaft then carries the roller $e^3$ away from the axis of the shaft until the concentric portion of the cam-groove is again reached at $f^2$. During this latter movement the motion of the outer end of the beater-arm is retarded with reference to the general motion of the reel-shaft. The accelerated and retarded movement described is preferably arranged to take place at the time the beater is passing over the cutter-bar of the harvester, so that the grain will be thrown back quickly over the cutters and the beaters will leave it with a slow motion.

In order to provide means for changing the position in which the variable motion of the beaters takes place with reference to the cutter-bar, the cam-plate F', which gives the variable motion to the beater-arms, is made adjustable upon its bearings on the standard A. For this purpose the said cam-plate is attached to the bearing-box C, so that it may be partially rotated thereon by means of a grooved collar, $f$, which is bolted to the outer side of the plate F', and which fits over a flange, $c$, upon the stationary bearing C. The cam-plate F' is held in position and is adapted to be moved by means of a lever, G, which is bolted to the upper portion of the side of such plate, and which projects in a nearly horizontal position toward the rear of the machine, and in position convenient to the driver thereon. This lever G is held in position by means of a spring-detent, $g$, which engages a notched segment, H, bolted to the top of the lever $A^2$. By moving the lever G and turning the cam-plate F' upon its axis the place at which the accelerated movement of the beaters occurs may be varied, as desired, according to the conditions of the grain or other circumstances.

Upon the standard A is bolted a spring, I, the free end of which rests against the under side of the end of the short arm $a'$ of the lever $A^2$ and under the reel-shaft bearing. The effect of this spring is to tend to force the end of the lever upward; and its object is to assist the operator in raising the reel, and also to support the end of the lever $A^2$ when the detent $a^3$ is released from the notched segment $A^2$ in the operation of adjusting the reel in reference to the cutter-bar.

I am aware that devices have been heretofore used for varying the speed of the beater-arms in harvester-reels, in which said arms are pivoted loosely to radial arms upon a reel-shaft, and hang vertically, so as to revolve upon their pivots during the rotation of the reel, the outer ends of said arms being thrown rapidly forward, as they pass over the cutter-bar, by the action of short stationary cam-surfaces, constructed to engage projections upon said arms above their pivoted points. My invention does not, therefore, embrace a construction similar to that above described, but is restricted to a device in which the beater-arms are held positively in position during the entire rotation of the reel, and oscillated upon their pivotal points through a short arc only.

A reel having its arms and beater-blades rigidly secured to the reel-shaft may obviously be combined with mechanism by which the speed of the blades may be intermittingly accelerated and retarded; but, for the double purpose of producing such variation and for changing the points of variation, I prefer to make the blades independently variable in their movement, as herein shown, for the reason, among many, that the variation of the motion of a single blade may be effected by a less expenditure of power than would be required to effect the same change in the motion of the entire reel structure.

I claim as my invention—

1. In a harvester-reel, the combination of the reel-shaft having radial arms D', beater-arms E, pivoted to said arms, and provided with roller-pins $e^3$, and a grooved cam-plate, F', engaging said roller-pins, and adapted to give an oscillatory motion to said arms, substantially as described.

2. The combination of the reel-shaft having radial arms D', beater-arms E, pivoted to said arms, and consisting of crossed strips E' $E^2$, the strips E' extending inwardly from the pivotal points of the beater-arms, to form arms $E^3$, and roller-pins $e^3$, carried by said arms, substantially as described.

3. The combination of the bearing-box C for the reel-shaft, having an annular flange, $c$, the cam-plate F', provided with a collar, $f$, adapted to embrace the flange, and an adjusting-lever, G, substantially as described.

4. In a harvester, the combination of a reel-standard, a vertically-movable support carried by said standard, and provided with bearings for the reel-shaft, means for adjusting said support vertically and holding it in its adjusted position, and a spring attached to the standard and acting against said reel-support, to counteract the weight of the reel, substantially as described.

5. The combination, with the standard A, the reel-supporting lever $A^2$, and devices for adjustably holding the same, of a spring, I, attached to the standard A, and arranged to press against the lever $A^2$, so as to counteract the weight of the reel, substantially as described.

In testimony that I claim the foregoing as my invention I affix my signature in presence of two witnesses.

GUSTAVUS A. PADDOCK.

Witnesses:
 EDW. ELWELL,
 E. E. SEFFENS.